TREATING TIME AND HARDNESS AS FUNCTIONS OF
COMPOSITION OF TRAY SOLUTION.

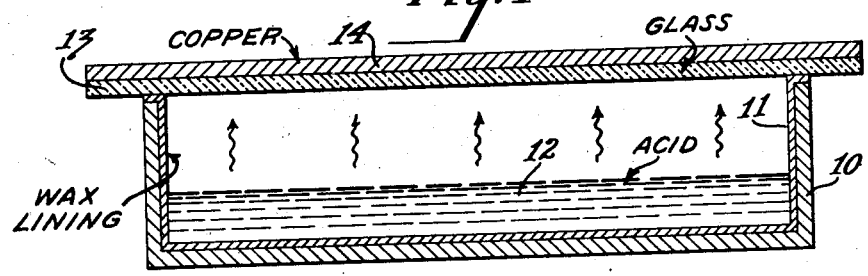
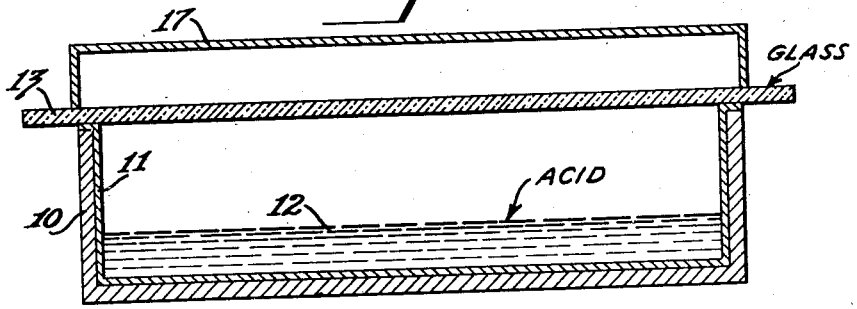
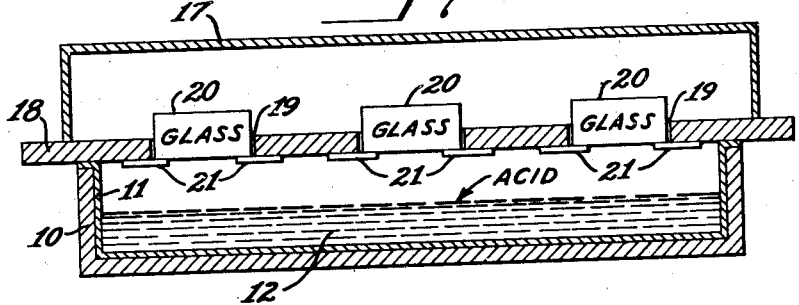
Inventors
Frederick H. Nicoll
& Ferd E. Williams
Attorney July 13, 1948.  F. H. NICOLL ET AL  2,445,238
PRODUCTION OF SKELETONIZED LOW REFLECTANCE
GLASS SURFACE WITH FLUOSILICIC ACID VAPOR
Filed Oct. 8, 1946  6 Sheets-Sheet 2

(SOFT FILMS BELOW DOTTED LINE. ALLOW ± 20% ON TIME FIGURES.
DATA FROM 2¼ INCH CUPS, ⅛ INCH AIR SPACE) 25°C.

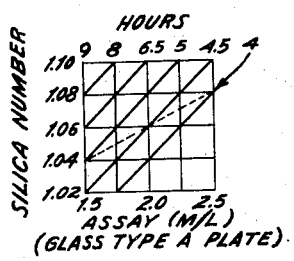
Fig. 4a (GLASS TYPE A PLATE)

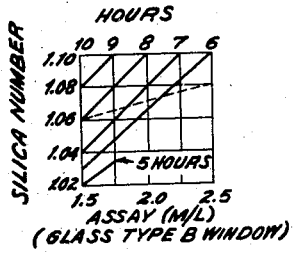
Fig. 4b (GLASS TYPE B WINDOW)

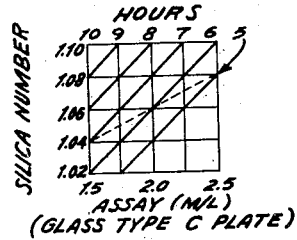
Fig. 4c (GLASS TYPE C PLATE)

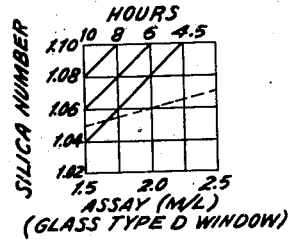
Fig. 4d (GLASS TYPE D WINDOW)

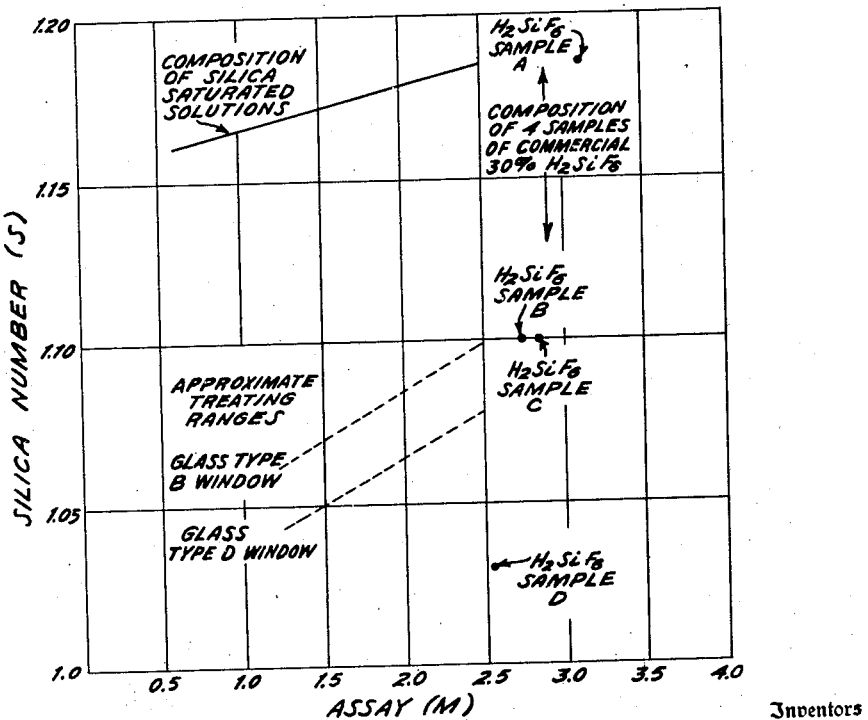
Fig. 5

Inventors
Frederick H. Nicoll
& Ferd E. Williams
By
C D Tuska
Attorney

July 13, 1948.  F. H. NICOLL ET AL  2,445,238
PRODUCTION OF SKELETONIZED LOW REFLECTANCE
GLASS SURFACE WITH FLUOSILICIC ACID VAPOR
Filed Oct. 8, 1946  6 Sheets-Sheet 3

Inventors
Frederick H. Nicoll
& Ferd E. Williams
Attorney

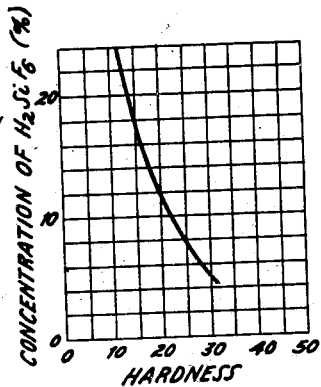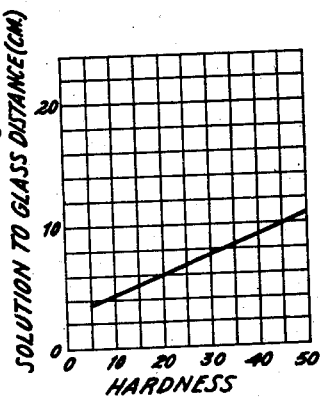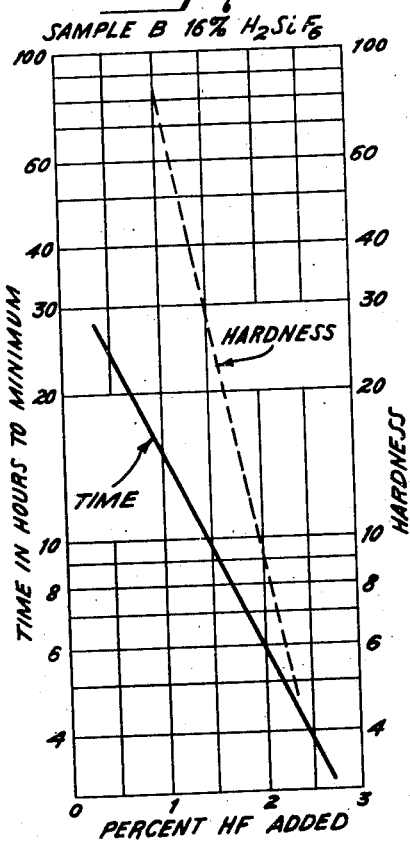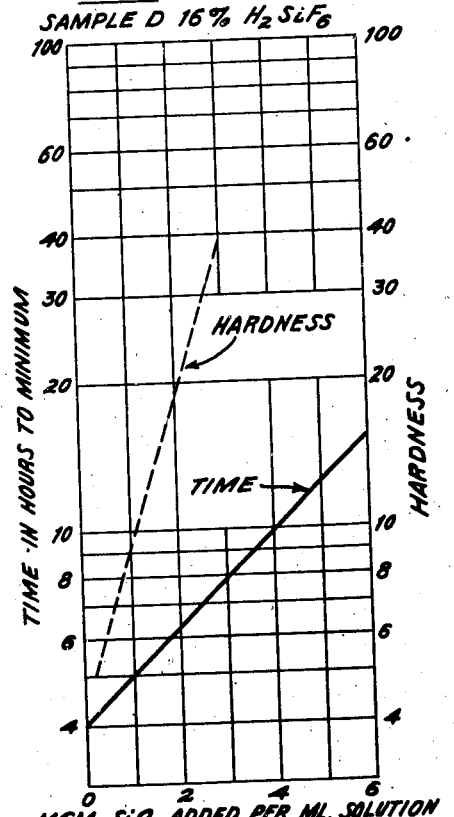

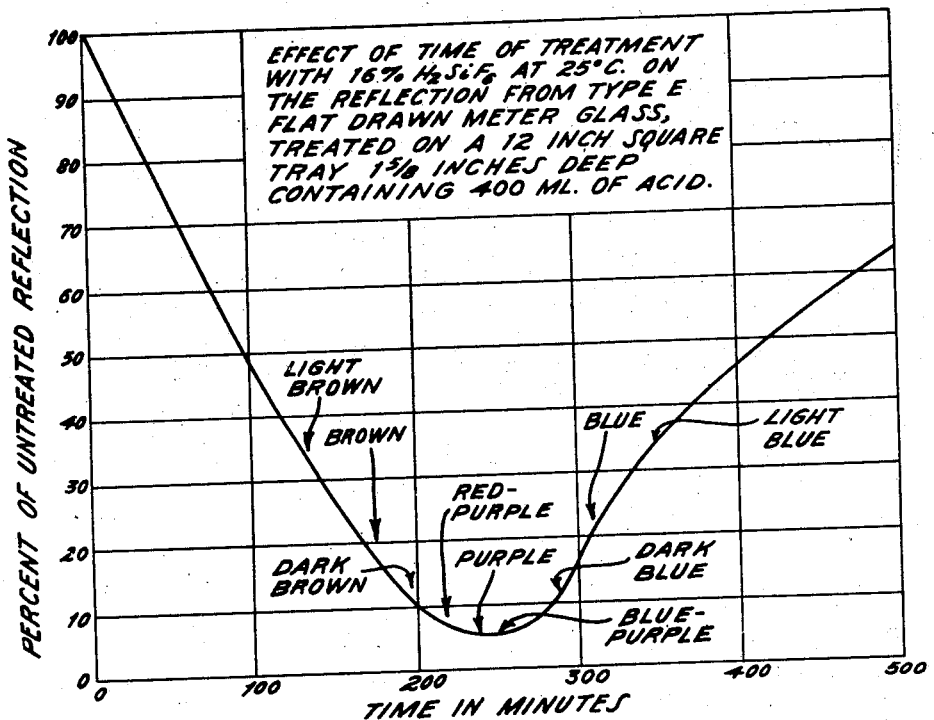

Patented July 13, 1948

2,445,238

UNITED STATES PATENT OFFICE 2,445,238

PRODUCTION OF SKELETONIZED LOW REFLECTANCE GLASS SURFACE WITH FLUOSILICIC ACID VAPOR

Frederick H. Nicoll and Ferd E. Williams, Princeton, N. J., assignors to Radio Corporation of America, a corporation of Delaware Application October 8, 1946, Serial No. 701,902

7 Claims. (Cl. 41—42)

This application is a continuation-in-part of an application of Nicoll and Williams, Serial No. 488,938, filed May 28, 1943, for "Low reflective elements," now abandoned. The invention relates to elements made of glass or the like and provided with a low reflective film or coating on the part of its surface normally presented to an observer. Such a low reflective element is disclosed and claimed in a copending application of Frederick H. Nicoll, Ser. No. 461,958, filed October 14, 1942, and assigned to the same assignee as the present application. In accordance with this copending application, the glass surface is treated with dilute hydrofluoric acid vapor under conditions promoting substantially uniform gas concentration and distribution at the treated surface, the treated surface being maintained at a temperature higher than that of the acid solution in order to prevent condensation of moisture at the treated surface, and the treatment being continued until a layer skeletonized to the desired extent and having the desired thickness is formed.

While the method of treatment disclosed by the aforesaid application has proved satisfactory in many respects, the necessity of maintaining a temperature difference between the treated surface and hydrofluoric acid bath or solution is a complication which it is desirable to avoid. The earlier method also involves rather exact control in order to insure uniform gas distribution and concentration at the surface undergoing treatment, and also to insure conditions suitable for the formation of hard films.

The present invention has for its principal object the provision of an improved method of operation which avoids the necessity of maintaining a fixed temperature difference between the treated surface and the solution from which the active components are derived.

Another object is the provision of an improved method of operation whereby the concentration and distribution of the active gas is rendered more uniform, and the conditions for hard film formation are made less critical.

A further object is the production of a low reflective coating which is harder than those produced by former methods and requires less time for its production.

A still further object of this invention is to treat the surface of a transparent body such as glass with vapor derived from a solution of fluosilicic acid while maintaining the silica number of the acid at a value conducive to the production of a hard skeletonized film of low reflectance.

The invention will be better understood from the following description when considered in connection with the accompanying drawings, in which Figs. 1 to 3 are cross-sectional views of three embodiments of an apparatus useful in practicing this invention;

Figs. 4a to 4d show time of treatment as a function of the assay and silica number of the acid;

Fig. 5 shows the assay and silica number of commercial fluosilicic acids with relation to the desired characteristics for the treatment of glass;

Fig. 11 illustrates the relation of film hardness to acid concentration;

Fig. 12 shows the film hardness as a function of the distance from solution to glass;

Fig. 13 shows the variation of hardness and time of treatment as a function of the amount of concentrated HF (47%) added to an original 16% solution of acid;

Fig. 14 shows the variation of hardness and time of treatment vs. the amount of added silica; and Fig. 15 shows time of treatment vs. the reflectance of the glass.

Figure 6:
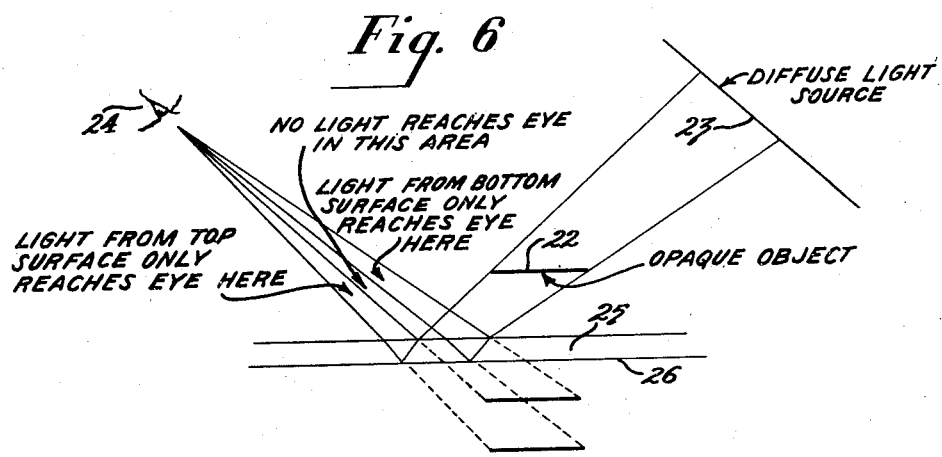
Fig. 6 is a sketch illustrating a method of separating the reflections from the two surfaces of glass.

Skeletonization as an aid to the reduction of reflection from a transparent body was first disclosed by Blodgett in Physical Review, February 15, 1939. A very thin film of soap was deposited on glass and the film was then treated to dissolve out certain components, leaving a skeletal structure with air filling the spaces formerly occupied by the dissolved material. Blodgett noted that the spaces and the solid portions must be of molecular dimensions, at least smaller than a wavelength of light, if transparency is to be retained. Surface reflections are reduced by the well known interference effect when the film thickness is equal to a quarter wavelength of the incident light. As is also well known, the maximum reduction of reflection occurs when the index of refraction of the film is equal to the square root of the index of the base glass, when viewed in air. The function of the skeletonization is to reduce the index of refraction of the soap film to an approximation of the optimum value. This method has not come into commercial use because the film is extremely fragile and is easily wiped off.

The production of a reflection reducing film by the chemical treatment of the glass surface with an acid solution is also well known. For example, the glass may be immersed in a nitric acid solution. (See U. S. Patent 2,220,862.) This method, however, is limited to the treatment of certain types of glass which contain a metal, and such glasses inherently have a high index of refraction. The nitric acid process is known as "etching" and is distinguished from skeletonizing in that in the former case the acid removes only the metallic components of the glass and leaves a surface presumably of solid silica, since in every case the measured index of refraction which results is simply that of solid silica; whereas in the latter case the acid reacts to some extent on the silica as well as the non-silicious components to produce a surface layer which has a porous structure of molecular dimensions characterized by an index of refraction which may be much lower than that of any component of the glass in its solid state. Also to be distinguished from skeletonizing are the various frosting processes which treat the interior of glass bulbs, for example, to produce a frosted or opaque surface which disperses the light. Frosting has no utility in the reduction of reflection since the transparency of the glass is destroyed. Frosting merely pits the surface, with no attempt to produce a surface film having a critical thickness bearing a predetermined relation to a wavelength of light, and since light is dispersed, the dimensions of the surface irregularities must be greater than a wavelength of light.

In accordance with the present invention it has been discovered that by substituting fluosilicic acid ($H_2SiF_6$) for the hydrofluoric acid of the earlier Nicoll vapor method, the necessity of maintaining a temperature difference between the solution and the treated surface is avoided. In addition to greatly simplifying the apparatus required, a coating of superior hardness is obtained.

Glass in contact with saturated water vapor is known to have a thin film of water adsorbed on its surface. A soluble, so-called "white deposit" is formed during the production of the skeletonized film by the hydrofluoric acid vapor method. This deposit consists of fluorides and fluosilicates. Also, water is a product of the reaction between the glass and hydrogen fluoride. These facts indicate that during the film formation a thin solution, saturated with respect to alkali and alkaline earth fluorides and fluosilicates, exists at the glass surface, while an inch or two below the glass is a dilute hydrofluoric acid solution.

Raoult's law states that the vapor pressure of a solution is lowered in proportion to the molecular concentration of the solute dissolved. It is therefore apparent that the solution on the surface of the glass during treatment will have a lower vapor pressure than pure water at the same temperature due to the dissolved fluosilicates. If the acid solution and the glass were maintained at the same temperature there would be a vapor flow in the direction of the glass tending to increase the water content in the solution on the glass surface. This is due to the difference in vapor pressures. Such a variation in water content on the glass surface produces a soft film or no film at all. The unequal vapor pressures have heretofore been compensated by decreasing the temperature of the acid solution to a value a few degrees below that of the glass. This result could be equally well produced by applying Raoult's law to the acid solution thus reducing the vapor pressure of the solution to the desired value by the addition of salts, as described and claimed in a copending application of Nicoll and Williams, Ser. No. 488,938, filed May 28, 1943. If the salt solution on the glass is to remain approximately constant with respect to time it is necessary for the vapor pressure of the acid solution and the solution on the glass to be approximately the same. Under these conditions the glass will neither become wetter nor dryer as the process of film formation proceeds, and hence the best conditions for operation are maintained. In fact, it would seem advisable to select the conditions such that the solution on the glass surface would have a slightly greater vapor pressure so that some of the water formed during the glass attack would be removed.

The use of fluosilicic acid as a source of vapor for producing low-reflection films on glass came about as a result of considerations regarding the formation of fluosilicates and the silica film at the glass surface. The reactions occurring at the glass surface may be written in the following way:

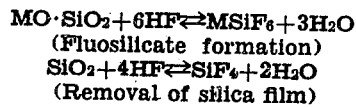

$$MO \cdot SiO_2 + 6HF \rightleftharpoons MSiF_6 + 3H_2O$$
(Fluosilicate formation)
$$SiO_2 + 4HF \rightleftharpoons SiF_4 + 2H_2O$$
(Removal of silica film)

The first reaction indicates the white deposit formation and uses up a molecule of silica for each molecule of metal oxide present. The silica which remains will form the skeletonized film if the second reaction does not proceed towards the right. The rate of silica film formation will vary directly as the first reaction and inversely as the second. It is therefore desirable to promote the first reaction and inhibit the second. On the basis of the Mass Action Law, the second reaction can be inhibited by increasing the vapor pressure of $SiF_4$ in the system. This mechanism may explain why increasing the HF vapor pressure too much fails to increase the speed of film formation and may even result in no production at all. This would probably not be the case if the $SiF_4$ vapor increased with the HF.

The present invention may be practiced by filling a wax-lined copper tray 10, 2" deep by 12" square, with 16% fluosilicic acid 12 to a depth of ⅛". The glass 13 to be treated is then placed over the top of the tray preferably with an airtight seal around the edges and covered with a copper plate or lid 14. At a temperature of about 25° C. there is produced in about 4½ hours a hard low index film of a thickness suitable for minimizing the reflection of green light. A coating of ceresine wax is used in the tray to prevent attack by the acid, or it can be coated with several baked layers of Harvel 612C insulating varnish made by the Irvington Company of Irvington, New Jersey. Metal is specified for the tray 10 and lid 14 because of its thermal conductivity. The conductivity of the tray and lid assists greatly in maintaining temperature uniformity of the glass and solution. While it may not be essential to use metal when the temperature stability of the room is particularly good, there is always a certain amount of danger from drafts causing non-uniformity of temperature over the glass surface. This is the reason for recommending the use of metal trays and covers except under conditions that are exceptionally suitable.

Referring to Fig. 2, an alternative arrangement is shown for eliminating drafts and unequal temperature. It will be seen that the tray 10 is lined, is provided with the acid solution 12, and is covered by the glass 13 to be treated. In these respects the apparatus of Fig. 2 is similar to that of Fig. 1. The copper plate 14 of Fig. 1 is replaced by an inverted tray or lid 17, which is preferably made of metal, and which traps the air in an enclosed space so as to eliminate air currents and maintain a uniform temperature distribution.

When several small pieces of glass are to be treated, the apparatus of Fig. 3 may be used. In this arrangement the tray 10 is covered by a metal plate 18 which is provided with openings 19. The openings are adapted to receive the glass pieces 20 to be treated. The several pieces 20 may be supported by fine wires 21. The supporting wires may be soldered or otherwise fastened to the metal plate. This method of treating small pieces has been found to give uniform films to within $\frac{1}{16}$" of the edge of the treated surface.

The fluosilicic acid solution is made up from technical quality concentrated acid (usually 30%), although commercial quality may be satisfactory. A concentration of 16 percent by weight is used in general, but as much as 25 percent may be used on some glasses in order to speed up the process. It has been discovered that the HF content of the acid is to a large extent the determining factor in the operation of the process, and for best operation the composition of the solution in the tray must be kept within certain limits, to produce acceptable low-reflection films. The raw acid from various sources shows considerable variation in composition. Even from a single source, the composition cannot be relied upon to remain constant. The tray solution is found to change slowly in composition while it is in service, presumably because of evaporation and reaction with glass.

Thus it is evident that a method of fully characterizing and controlling the composition of fluosilicic acid solutions may be useful in the vapor process of treating glass. Such a method has been developed by S. M. Thomsen. It consists of two acidimetric titrations on the sample. Procedures for these titrations will be given, together with control operations based on the results of the titrations.

The ordinary fluosilicic acid is generally specified as being 30%. This is a percentage by weight. These percentage figures will be abandoned for the purposes of this discussion for two reasons. First, while a pound of 30% acid diluted with a pound of water yields a 15% acid, if the 30% acid is diluted instead with an equal volume of water the resulting solution is over 16%. Second, two solutions may both be 16%, and yet differ in composition, because the acid can vary in silica content. Therefore, the assay will be defined as what might be called the total acidity, as obtained from the titration II to be described, computed to moles per liter of $H_2SiF_6$, assuming 6 equivalents of alkali per mole of $H_2SiF_6$. This figure, M, is independent of the silica content, and dilution with an equal volume of water reduces the assay (so defined) or molarity, to half. Commercial 30% acid has ranged from 2.5 to 3.1 molar (moles per liter of $H_2SiF_6$).

Unlike most acids, fluorsilicic acid varies in composition aside from its water content. Specifically, the silica content may be less or greater than that demanded by the formula $H_2SiF_6$. The silica content may be specified as a "silica number, S," so defined in terms of titrations I and II, that for the theoretical $H_2SiF_6$ the number is 1.00, and the number is proportional to silica content. Fluosilicic acid in concentrations near 2.5 molar, fully saturated with silica, has a silica number of 1.18. That is, it contains 18% more silica than the theoretical $H_2SiF_6$. Hydrofluoric acid, HF, may be considered to be fluorsilicic acid of silica number 0, since it contains no silica. Consequently, a silica number of less than 1.00 means the presence of free HF. Commercial 30% acid from various sources has ranged from 1.03 to 1.18 in silica number.

It should be understood that the silica content consists not of free silica, but of fluorinated species such as $SiF_6^=$, $H_2SiF_6$ and probably $SiF_4$.

If the vigor of the attack on the glass by the tray solution is too great, a soft film results. If too low, the resulting film is too high in index, and therefore too low in efficiency. The greater the concentration (assay) and the lower the silica number, the more vigorous the attack. At certain combinations of assay and silica number, therefore, a particular glass will produce a film which will be a chosen compromise between hardness and efficiency. Treating time for a particular glass at a particular temperature is determined by the composition of the solution. As seen from the curves for four sheet glasses in Fig. 4, hardness and treating time increase upward and to the left in each case. The dotted line connects combinations which produce films of about the minimum hardness acceptable as judged by a fingernail test, and these films are near the optimum index of refraction, and therefore rather efficient. These data were obtained with a $\frac{7}{8}$" distance from solution to glass. Trays of other dimensions may be expected to display a shift in the values required to produce a given result; deeper trays require more vigorous solutions.

Since it has not previously been known that the silica content of fluorsilicic acid varies considerably between different manufacturers, and since the "silica number" controls the success of the vapor treatment, information will be given showing how to measure the molarity ($M_0$) and silica number ($S_0$) of the commercial acid, and then how to adjust the raw acid to give a solution having the molarity of ($M_x$) and silica number ($S_x$) desired for the treatment of a particular glass, or for a particular purpose.

For acids above 1.5 molar, as are encountered in the tray process, a 5.00 ml. sample is taken for analysis. It is delivered from an internally waxed pipette into a Lucite dish. About 3 gm. (±0.5 gm.) of powdered NaF is added. Lumps generally form; these are broken up with a Bakelite rod, and the mixture stirred. Bromthymol blue indicator, 10 drops of 0.1% solution in alcohol, is added, making the mixture a bright yellow. The mixture is titrated with NaOH of normality N (2 to 2.5). At the approach of the end point, the color becomes greenish yellow. The end point is taken at the darkening to a blue of greenish cast. Running past the end point produces a royal blue; this color cannot be used for the end point, because while it appears with each added drop of alkali, it soon fades to the greenish blue mentioned. Care must be taken to titrate the acid trapped among the solid particles; the yellow or yellow-green must not return upon stirring. If some of the alkali is run in before the NaF is added, softer lumps or none are formed, and the titration is done more quickly. Let A=No. of ml. of NaOH solution consumed. Titration II is performed as a further operation on the same sample.

This is the usual assay titration described in the literature. The blue mixture left after titration I, about 15 ml. in volume, is washed into a 600 ml. Pyrex beaker with hot (95° C.) water, and the volume brought to about 300 ml. The solution is now greenish yellow in color. Phenolphthalein indicator (10 drops of 1% solution in alcohol) is added and titration with NaOH continued. The solution darkens through green to blue as the end point is approached. The end point is taken as the phenolphthalein turns red; and since this is mixed with the blue of the first indicator, the end point is the appearance of a purple color. The solution is finally brought to 95° C. and stirred; if the purple color does not fade to blue the titration is completed. Let B=No. of ml. of NaOH solution consumed by the sample, including that used in titration I.

Titration of a 5.00 ml. sample yields the following data:

N—normality of NaOH
A—ml. NaOH, titration I
B—ml. NaOH, titrations II+I

The assay or titre, M, is then $$M = \frac{100}{3} BN (\pm 1\%)$$

The titration ratio, R, is defined as $$R = A/B$$

from which the silica number, S, is given by $$S = 3/2 \ (1-R) \ (\pm.005)$$

Designating as $M_0$, $S_0$, the composition of the raw acid on hand, or the solution to be adjusted, and as $M_x$, $S_x$, the composition to be achieved, the computation will be separated into several steps to avoid complications.

A. Dilution to 2.50 molar. Take $V_0$ ml. of the solution of composition $M_0$, $S_0$, and add water to make the volume $V_1$:

$$V_1 = \frac{M_0}{2.50(V_0)}$$

The volume of water required $W_1$ will be $$W_1 = V_1 - V_0$$

B. Decrease of silica content (if required) from $S_0$ to $S_x$. To the $V_1$ ml. of acid ($M=2.50$, $S=S_0$) add F ml. of 15 N HF as follows:

$$F = V_1 \left( \frac{S_0 - S_x}{S_x} \right)$$

This makes the volume now $V_2$ ml.:

$$V_2 = V_1 + F$$

of fluosilicic acid, $M=2.50$, $S=S_x$.

C. Increase of silica content (if required) from $S_0$ to $S_x$. To the $V_1$ ml. of acid ($M=2.50$, $S=S_0$) add, instead of the HF, Q ml. of silica saturated fluosilicic acid ($M=2.50$, $S=1.18$) as follows:

$$Q = V_1 \left( \frac{S_x - S_0}{1.18 - S_x} \right)$$

This makes the volume now $V_2$ ml., thus:

$$V_2 = V_1 + Q$$

of fluosilicic acid, $M=2.50$, $S=S_x$.

D. Final dilution from $M=2.50$ to $M_x$. To the $V_2$ ml. of acid ($M=2.50$, $S=S_x$), water is added to increase the volume to $V_3$, thus:

$$V_3 = \left( \frac{2.50}{M_x} \right) V_2$$

The amount of water required is $W_2$ ml., thus:

$$W_2 = V_3 - V_2$$

The final result is $V_3$ ml. of acid, $M=M_x$, $S=S_x$, obtained by adding to $V_0$ ml. of the original acid W ml. ($=W_1+W_2$) ml. of water and either F ml. of 15 N HF or W ml. of silica saturated 2.5 molar acid.

These reagents were chosen to have the same assay (by titration II) as the acid (2.50 molar) with which they are to be mixed, to simplify computations.

The required 15 N HF is obtained by diluting a concentrated acid of known titre. The titre is obtained by the conventional titration (using plastic or waxed containers) with NaOH (about 2–2.5 normal) using phenolphthalein indicator. Thus, for a 5.00 ml. sample, consuming M ml. of NaOH of normality N, the titre T (normality) of the HF is as follows:

$$T = \frac{MN}{5}$$

This reagent may be thought of as 2.50 M fluosilicic acid from which all of the silica had been removed (silica number =0).

The 48% C. P. hydrofluoric acid has been found to run close to T=28 normal, and, if this value is assumed, 15 N acid may be prepared by diluting 150 ml. of the 48% acid with 130 ml. of water, giving a volume of 280 ml. of 15 normal HF.

The 2.50 molar silica saturated fluosilicic acid is prepared by suspending hydrated silica in a 2.50 molar fluosilicic acid solution for several hours, agitating occasionally and filtering. Crude silica (powdered sand) dissolves too slowly to be usable.

Fig. 5 is a graph showing (a) the assay ($M_0$) and silica number ($S_0$) of 4 samples of commercial 30% $H_2SiF_6$ as received from the manufacturers. Sample A has a molarity of over 3.0 and a silica content approaching saturation (1.185). Without correction the vapor from this acid would not skeletonize glass. Samples B and C are about the same, M is approximately 2.8 and S is 1.10. From the curves of Fig. 4 it may be seen that without correction as to silica number a film of high index would result, and the silica number preferably should be reduced to a more suitable value as described above. The coincidence of these samples having nearly the correct silica number explains why skeleton films were produced with these acids. Dilution alone would bring these samples into the region which would produce a usable film on certain glasses. Sample D is on the upper edge as to strength but too low in silica number. This results in excessive activity and a soft film is produced.

Another method of determining whether a given sample of acid is suitable is to conduct a series of tests using small cups approximately 2 in. in diameter and of the same depth as the large tray. 16 percent solutions of the acid are made up and various small quantities of silica are added to another range of samples. A good range to cover in such trial samples is from 0 to 1 percent HF and from 0 to 100 mg. of powdered silica per 10 cc. of 16 percent solution. About five equal steps for both sets of samples is most suitable and these should suffice for the commercial acids available. These sample cups are now used to produce a film on the particular glass which it is desired to treat, the glass being placed on the top of the cup. After a period of ten hours or so a number of the cups will have produced films and if they have been observed periodically it will have been possible to remove all the samples at or near the first minimum of reflection. The results will now show a variation in time of treatment, hardness, and the efficiency of the reduction of reflection. It is necessary at this point to select the most suitable result and note the solution which produces it. The best sample consists of a compromise of the above-mentioned factors but it is essential to obtain low reflection, at most 10 percent of the untreated reflection, and yet retain a fair degree of hardness. A hardness corresponding to about 8 strokes with wet rouge using the arrangement described in a later paragraph on hardness is probably the minimum that should be considered. The quality of the selected film should be such that there is very little scattered light under fairly intense illumination against a dark background. When the correct composition of the acid has been decided upon, a quantity of solution is made up sufficient to cover the bottom of the tray to a depth of about ⅛ inch. If the tray is deeper than 1⅝ in. then the acid is poured in till the distance from the acid to the glass is 1½ in. This is the recommended distance between glass and acid for the most satisfactory results.

It is, of course, necessary to maintain losses due to evaporation and when large quantities of glass are being treated it is necessary to replenish the solution due to the loss of acid in treating the glass. The need for this will become apparent when the treating time has changed by about 10 to 20 percent. Because of the low vapor pressure of HF and $SiF_4$ compared with the vapor pressure of $H_2O$, the solutions tend to concentrate themselves so that water must be added as evaporation takes place.

As the treatment proceeds a white deposit forms on the glass which gives it a translucent appearance. The amount of this white deposit is a function of the glass composition. This must be washed off soon after the glass is removed from the tray, otherwise it remains strongly adhered to the glass.

The time at which glass of a given composition should be removed can be determined by inspection after a little experience. In order to do this it is necessary to observe the color of white light reflected from the lower surface of the glass as it is exposed on the tray. This can be done by observing the separate images from the top and bottom of the glass. Referring to Fig. 6, it can be seen that the images can be separated by looking at the shadow images of an opaque object 22, illuminated by the light source 23, which may be any source such as an electric light bulb. As seen by the eye 24 the image of the opaque body is observed to have a black middle portion and a light edge on the sides nearer and farther from the observer. The width of this edge depends on the glass 25 thickness and viewing angle. The edge farther from the observer is colored by the light from the lower surface 26, and this is the edge for observing the amount of treatment. The white deposit modifies the color of the lower surface and it has been found that the edge which shows the color of the lower surface should appear blue to the eye when the glass is finished if the glass has the composition of ordinary window glass. If the white deposit is now washed off with running water and the glass dried, the surface will then appear the desired purple color.

Borosilicate crowns and heavy lead glasses appear to have less white deposit in general and these are therefore at the minimum for green light when the color with the white deposit on is between purple and blue.

For many purposes the time of treatment can be obtained fairly well by timing and correcting for any average temperature change, if experiments have already been run on the same type of glass. This assumes that the acid concentration remains constant. It must be remembered that good results are only obtained in the neighborhood of 25° C. with acid concentrations near 16 percent. When a number of trays are used it is desirable to have exactly the same concentration of acid in each tray (preferably obtained by mixing). If the height of the glass above the acid is the same in each tray and they are all at the same temperature then inspection of one tray serves to give the time of removal for all. Estimation of the approximate time of treatment can be obtained from a knowledge of the time of treatment at a given temperature for the particular glass used.

Fluosilicic acid vapor treatment of glass to reduce reflection is essentially a surface treatment and success therefore depends on the condition of the glass surface. For this reason polished plate glass and fire polished, flat drawn window glass of the same composition nevertheless treat at somewhat different rates. A good, clean surface is essential for obtaining uniform films free from scattered light. The surface must also be dry before treatment (drying with a cloth is sufficient). One satisfactory method of cleaning is to use Bon Ami or powdered chalk. This is applied wet, the glass being thoroughly rubbed with a cloth, after which the Bon Ami is washed off before it dries. The glass is then thoroughly dried with a clean cloth.

A brief dip, up to about 4 min. in 0.5 percent HF solution, followed by rinsing and drying will usually give a good clean surface if the glass is fairly clean and grease-free before dipping. Too long a dip will visibly etch the glass and ruin the surface. This procedure is best applied to window glass and is not recommended for polished glass. With fresh glass this treatment may be successfully used to remove "roller marks."

Treated glass readily picks up oil or grease from contact with oily or greasy materials and this tends to remove its low-reflecting properties. In handling the glass it is advisable to avoid such contact and also to avoid fingering the glass. During shipment the glass must be wrapped in paper which will not produce spots on the glass after long contact. Glassine envelopes seem to be satisfactory for this purpose. The treated glass can be cleaned with water and any non-abrasive soap, but care must be taken to remove all the soap from the glass before it is dried with a cloth. The treated glass can be cleaned with any of the common acids if desired.

The description which has already been given of the method of producing low-reflection films by the use of fluosilicic acid has indicated its dependence on a number of factors. In order to produce satisfactory films it is desirable to know the effect of the various factors on the film formation. These effects have been investigated fairly exhaustively and the results are given in the following paragraphs.

EFFECT OF TRAY AREA

The area of the tray was a factor in the older hydrofluoric acid vapor method of reducing the reflection from glass. In going from a tray of six hundred square inches to three square inches, the time of treatment was increased by about two hundred percent. This effect was probably due to convection effects brought about by the use of a temperature difference. In the case of the present fluosilicic acid vapor method, which doesn't require a temperature difference, the time of reaction increases by less than two percent over the previously mentioned range of tray area. It may be concluded, therefore, that the effect of tray area in the fluosilicic acid process is negligible and the following data on the effect of other variables applied to tray sizes from three square inches to six hundred square inches, unless otherwise specified. Edge effect on the treated glass is proportionately larger on the small trays.

EFFECT OF TRAY HEIGHT

Figure 7:
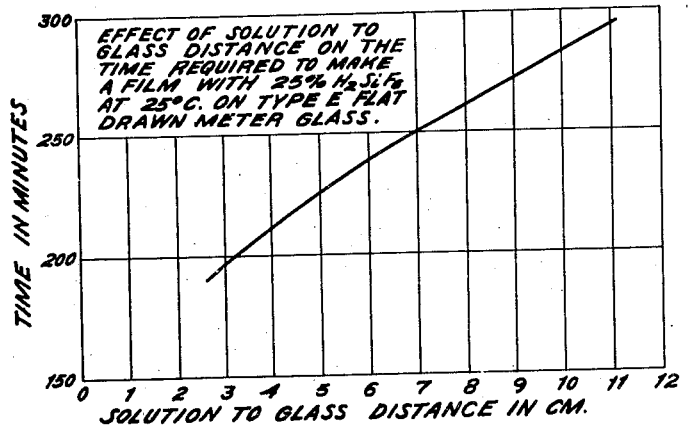
Fig. 7 illustrates how variations in distance between the solution and the glass affect the time of treatment.

Because the diffusion of the fluosilicic acid vapor from the solution to the glass is one of the rate-limiting processes in film formation, and because the rate of flow of a substance varies inversely with the length of the path of flow, it would be expected that increasing the distance from the surface of the acid solution to the glass surface being treated would increase the time of treatment. Experimentally this is found to be the case, as is shown in Fig. 7 for 25 percent by weight $H_2SiF_6$. The data for this curve were taken on trays three square inches in area. This curve over the approximate height range of 2.5 cm. to 6 cm. applies to trays up to at least six hundred square inches in area. Above about six centimeters high, convection difficulties appear in the case of the trays of larger area. Convection currents cause soft non-uniform films as well as pronounced changes in the rate of film formation. Solution-to-glass distances less than 2.5 centimeters also result in poor films, when using pure fluosilicic acid. For the range of tray heights over which satisfactory films are obtained, the time of treatment for Libbey-Owens-Ford flat-drawn glass varies with the solution-to-glass distance as is shown in Fig. 7 for 25 percent $H_2SiF_6$. Other glasses or other concentrations of fluosilicic acid may result in different absolute times of treatment, but the variation of time of treatment with solution-to-glass distance approximates the form of the curve of Fig. 7. A glass-to-solution distance of 1½ in. has been found to give the most satisfactory films with most glasses, when it is desired to keep the time of treatment as short as is consistent with good films.

EFFECT OF CONCENTRATION

Figure 8:
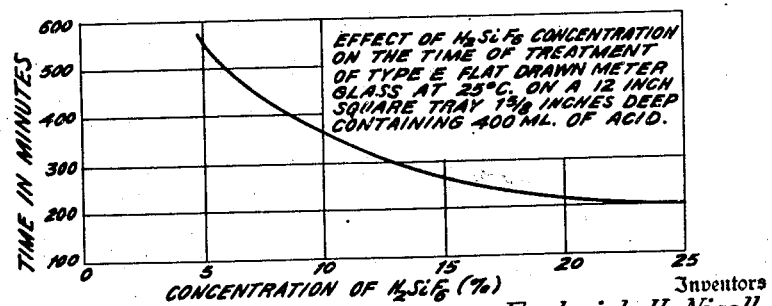
Fig. 8 illustrates the relationship between the concentration of $H_2SiF_6$ and the time of treatment.

The concentration of the fluosilicic acid used as a source of hydrogen fluoride and silicon tetrafluoride gas affects both the rate of the reaction and the quality of the resulting film. Theoretically this effect is due to two reasons. First, increasing the concentration of fluosilicic acid results in a decrease in the vapor pressure of water because the vapor pressure of each constituent is proportional to its mole fraction. This decrease in the water vapor pressure decreases the amount of adsorbed water on the glass surface so that the resulting film is harder and no temperature difference is required. Second, increasing the concentration of fluosilicic acid increases the concentration in the vapor of hydrogen fluoride and silicon tetrafluoride independently. These substances each affect the rate of film formation in different ways. The increased amount of hydrogen fluoride present at the higher concentration produces a more rapid attack on the glass while the silicon tetrafluoride more efficiently inhibits the attack on silica at higher concentrations. Solutions of fluosilicic acid concentration less than 13 percent by weight have a greater ratio of HF molecules to $SiF_4$ molecules in the vapor than that corresponding to $H_2SiF_6$, whereas solutions having a concentration greater than 13.3 percent have a smaller ratio of HF molecules to $SiF_4$ molecules in the vapor than that corresponding to $H_2SiF_6$. Because of these varied effects of fluosilicic acid concentration on the rate of film formation, the experimental dependence of rate of film formation on concentration follows no simple linear behavior but is best shown by Fig. 8.

It is possible to determine the order of the reaction involved in a process from the slope of the curve of concentration against time. The order of the reaction is given by $n$ in the expression $$-\frac{dC}{dt}=AC^n$$

Figure 9:
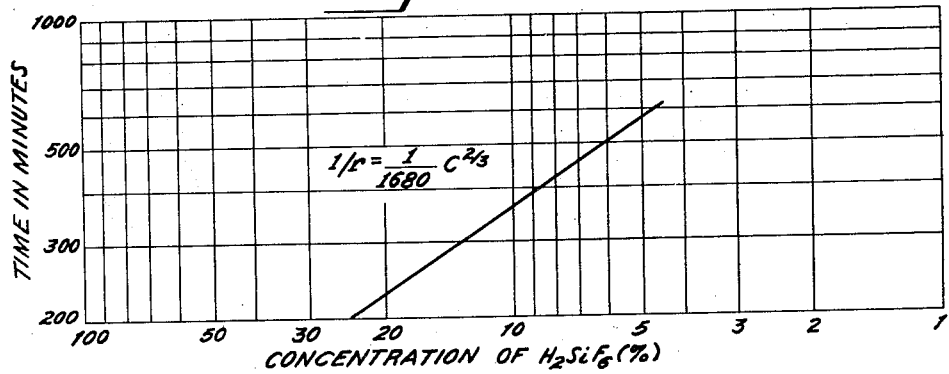
Fig. 9 shows the linear relation existing between the logarithm of the concentration and the logarithm of the time required to produce a quarter wave film.

In the film forming process the concentration changes only slightly as the film is formed, and so it is more convenient to obtain the order of the reaction from the relation between the time to complete a definite fraction of the reaction and the concentration. The order of the reaction $n$ is given by the relation $$T \propto \frac{1}{C^{n-1}}$$

which is derived from the above expression. In the case of film formation T is the time to produce a skeletonized silica film ¼ wavelength thick. Taking logarithms of both sides of this equation, the linear relation of the logarithm of the concentration and the logarithm of the time of treatment shown in Fig. 9 is explained. The slope of this curve is $n-1$, giving a value of ⁵⁄₃ for $n$. If the process of film formation were a simple one, the order of the reaction would be an integer. The simultaneous occurrence of side reactions, consecutive reactions, or opposing reactions with velocity constants of the same order of magnitude as the velocity constant of the main reaction are known to lead to deviations of the order of the main reaction from an integer. Also, ionic reactions are known to have velocities which are dependent on the concentrations of all the electrolytes in the solution whether they take part in the reaction or not. It is therefore most likely that the order of the reaction is represented by the nearest integer to that obtained from the slope of the curve. This indicates that the process of film formation is a second order reaction, which means that the slowest step in the process of film formation involves two molecules of fluosilicic acid. A possible mechanism satisfying this requirement is shown by the equation:

$$2H_2SiF_6 + SiO_2 \rightarrow 3SiF_4 + 2H_2O$$

Experimentally it has been found that below about 5 per cent fluosilicic acid large droplets are prone to form on the glass because of the high water vapor pressure. This produces soft films. Above about 25 percent fluosilicic acid, the tendency is to form visible etching and crystals. Crystal formation is particularly apt to occur when high fluosilicic acid concentration is coupled with high temperature. The limits of concentration over which satisfactory results are obtained varies with the glass composition and surface structure. For example, Pittsburgh window glass which is air-cooled without being drawn over rollers will not treat with 25 per cent fluosilicic acid, while Pittsburgh plate glass of the same gross composition but of different surface structure will treat satisfactorily with this concentration. A number of sheet glasses and various optical glasses treat most satisfactorily with 16 percent by weight $H_2SiF_6$ in which the free HF in solution is approximately zero.

EFFECT OF TEMPERATURE

Figure 10:
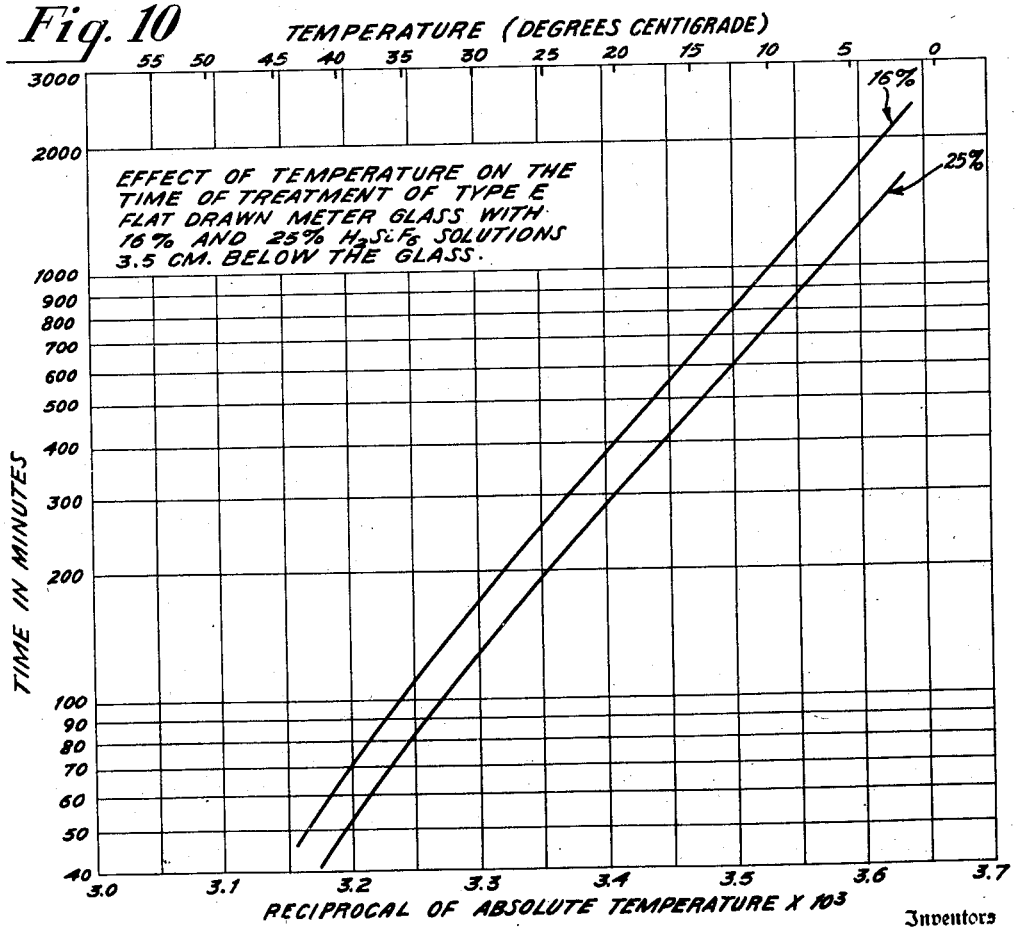
Fig. 10 shows the logarithm of the time of treatment vs. the logarithm of the absolute temperature.

Small temperature changes produce quite large effects on the time of treatment. At 25° C., for example, a temperature rise of 1° C. results in a 10 percent decrease in time of treatment, while a temperature drop of 1° C. results in a 10 percent increase in the time of treatment. The temperature dependence of time of treatment is shown in Fig. 10 for 16 percent and 25 percent fluosilicic acid over the temperature range of 0° C. to 45° C. At both concentrations the curve of the log of the time of treatment plotted against the reciprocal of the absolute temperature approximates a straight line. This indicates that the heat of activation for the rate-limiting process is only slightly temperature dependent. Also, the curves for the 16 per cent and the 25 per cent fluosilicic acid being parallel indicates that the heat of activation is only slightly dependent on concentration over this range. From the slope of the curve, the heat of activation can be calculated from the formula:

$$\Delta H = R \frac{d(\ln t)}{d\left(\frac{1}{T}\right)}$$

and equals 16 K' cal.

Experimentally at temperatures other than room temperature, difficulty in keeping glass and tray at constant, uniform temperature results in convection difficulties. At high temperatures such as 45° C. the increased speed of the process is more than compensated by the inconvenience of operation.

DEPENDENCE OF HARDNESS ON VARIOUS FACTORS

The hardness of the film produced by the fluosilicic acid vapor process is dependent on type of glass, concentration of acid and height of the tray. Table 1 gives a rough comparison of the hardness of film on various kinds of glass.

Table 1

| Glass | Process | Hardness |
|---|---|---|
| ¼ in. Pittsburgh plate | 16% $H_2SiF_6$ | 24 |
| LOF 12-14 oz. window glass | do | 12 |
| ⅛ in. LOF plate | do | 6 |
| ⅛ in. Pittsburgh plate | do | 1 |
| LOF 12-14 oz. window glass | Ethylene glycol and HF | 3 |
| LOF 12-14 oz. window glass | 1% HF with temp. diff | 6 |

These results were obtained on a 1½ in. deep tray using 16 percent $H_2SiF_6$ and were determined by measuring the number of polishing strokes necessary to remove the film using a felt pad and rouge. A weight of 380 gms. was used to press a cork-backed felt pad onto the glass. The pad was 1 in. in diameter and it was moved slowly back and forth by hand, the glass being wet with a mixture of rouge and water. Strokes were then counted as the pad moved forward or backward until the film was fairly well removed. These measurements give satisfactory results when used on the same type of film but are not so good when comparing films of different structures. The measurements of Table 1 were made with 16 percent $H_2SiF_6$ at 25° C. using a tray with solution-to-glass distance of 3.5 cm.

In general, the hardness of the film seems to be greater the longer the time of treatment. This fact is exemplified by the curves of hardness vs. concentration and hardness vs. tray depth which are shown in Figs. 11 and 12, respectively. These results were obtained using the felt pad and rouge polishing method. The curve for varying concentrations was obtained on 5.3 cm. diameter cups for a height of 2 inches using Libbey-Owens-Ford meter glass. The results for varying height were obtained on similar glass and cups using an acid concentration of 24 percent. It can be seen from the results that it is essential to arrive at a compromise between hardness and time of treatment. This we believe is best reached by using a tray 1½ in. deep with a concentration of 16 per cent.

EFFECT OF HF CONTENT

All the results described so far have been obtained by the use of fluosilicic acid in which the HF and $SiF_4$ are present in solution corresponding to the composition of $H_2SiF_6$. It was soon found that not all commercial fluosilicic acid would produce a satisfactory film on glass. Owing to different methods of preparation, some of the acid had too little HF in it, in other words an excess of silica (most probably as $SiF_4$), while other makes of acid had too much HF. Experiments showed that both these makes of acid could be made to work satisfactorily by adding sufficient HF or silica to bring the HF concentration back to the correct working value. Time of treatment, hardness, and the index of the film are all dependent on the HF content. It has been pointed out earlier, in the procedure for treating glass with fluosilicic acid, that the best method of determining the quantity of silica or HF that must be added is to do a series of experiments in small cups.

Fig. 13 shows the results of such a series of experiments on Du Pont commercial fluosilicic acid. Two approximately straight lines show the relation of hardness and times of treatment as a function of the amount of concentrated HF (47%) added to the 16 percent solution of Du Pont acid. These results are for Libbey-Owens-Ford window glass. As the HF content increases the hardness decreases and the time of treatment decreases. When about 2.5 percent HF has been added the hardness and the time of treatment are approximately the same as we would get if we had used 16 percent C. P. Baker fluosilicic acid with no HF added. The Du Pont acid therefore had the equivalent of about 2.5 percent negative HF. For low values of the HF content where the time of treatment is long and the film is very hard the index of the film is relatively high and the reduction in reflection is not very great. This corresponds to a silica film which is only slightly skeletonized or in which the skeleton is filled up with some material of greater index than air. For high values of HF content the process is much more rapid but the film is soft.

Fig. 14 shows the results obtained by adding various amounts of silica to C. P. Baker fluosilicic acid. These results fit in with those just described, and time of treatment and hardness increases with increasing amounts of silica. The index of the film also increases with the addition of silica to the acid solution. The results are for Libbey-Owens-Ford window glass. Time of treatment is given by the continuous curve and the dotted line gives the results for hardness.

It has been mentioned earlier that satisfactory films could never be obtained at solution-to-glass heights less than 1 inch when using 16 percent fluosilicic acid. In fact it was observed that experimentally it was not possible to obtain good films at lower heights even with other concentrations. In the experiments on adding silica to Baker acid it was found that the addition of silica in small quantities made it possible to obtain satisfactory films at heights as low as one-quarter inch. It was also found that although concentrations of Baker C. P. acid greater than 25 percent would not produce satisfactory films, the addition of silica made it possible to use concentrations as great as are available, viz. 30 percent. Due to the addition of silica, however, the time of treatment was still relatively long.

The above experiments indicate the important role that is played by the HF in the fluosilicic acid solution. The correct quantity is best determined by experiment and in general it has been found that the best results on the majority of common glasses are obtained when the HF content corresponds quite closely to that present in pure H₂SiF₆. In addition it seems most desirable to use a tray height of 1½ inches and a treating time not less than about four hours at 25° C.

EFFECT OF GLASS COMPOSITION AND TYPE

The fluosilicic acid vapor process has been used to treat a large number of glasses ranging from crowns to heavy flints. Time of treatment is a function of the composition of the glass and Table 2 gives the time of treatment of a number of different glasses, some of which are rouge polished and some are fire polished.

Table 2

Approximate relative treating times of various glasses. 16% H₂SiF₆, 25° C., tray 12 x 12 in., glass to liquid 1½ in.]

| Glass | Time to 1st Minimum in Minutes |
|---|---|
| X-ray protection glass, polished | 110 |
| Barium flint, polished | 215 |
| Dense barium crown, polished | 225 |
| Borosilicate crown, polished | 240 |
| L. O. F. 12-14 oz. picture glass, fire polished | 240 |
| ¼ in. Pittsburgh plate, polished and herculited | 240 |
| L. O. F. single strength, fire polished | 240 |
| L. O. F. double strength, fire polished | 270 |
| ⅛ in. Pittsburgh plate polished | 270 |
| ⅛ in. L. O. F. plate, polished | 270 |
| ¼ in. Pittsburgh plate, polished | 270 |
| ¼ in. L. O. F. plate, polished | 270 |
| Spectacle crown, polished | 270 |
| Dense flint, polished | 280 |
| ⅛ in. Pittsburgh window glass, fire polished | 415 |

The conditions under which the results were obtained are given at the top of the table. It can be seen that X-ray glass treats the most quickly and Pittsburgh window glass the most slowly. This latter glass is very similar in composition to the other window glasses but the annealing process is so different that the treating time is greatly affected. Pyrex cannot be considered as treating satisfactorily although some samples have given films under special conditions in about 19 hours. Fused, polished silica has never given a satisfactory film and in fact has shown no evidence of any film whatever.

THICKNESS-TIME RELATIONS

Fig. 15 shows the relation betwen time of treatment and the measured reflection of the glass. The reflection was measured by the combination of a tungsten light source having negligible emission in the violet and a 929 photocell having negligible sensitivity in the red. This arrangement is most sensitive to the green and corresponds to the eye sensitivity. The colors recorded along the curve are those observed visually after the white deposit has been removed. This curve indicates that a time variation of about 6 percent may be allowed from one piece to another without varying the reflection of the finished glass by too large an amount. This, of course, assumes that the concentration remains constant, and also the temperature.

What we claim is:

1. The method of reducing the index of refraction of a glass surface with an acid vapor derived from a fluosilicic acid solution having between 3% and 10% by weight more silica than called for by the theoretical proportions of the formula H₂SiF₆, which includes the step of subjecting a surface of said glass to said vapor, while maintaining said glass and said vapor at substantially the same temperature.

2. The method of reducing the index of refraction of a glass surface with an acid vapor derived from a fluosilicic acid solution having between 3% and 10% by weight more silica than called for by the theoretical proportions of the formula H₂SiF₆, and a molarity between 1 and 2.5, which includes the step of subjecting a surface of said glass to said vapor, while maintaining said glass and said vapor at substantially the same temperature.

3. The method of reducing the index of refraction of a glass surface with an acid vapor derived from a fluosilicic acid solution having between 3% and 10% by weight more silica than called for by the theoretical proportions of the formula $H_2SiF_6$, and a molarity between 1 and 2.5, which includes the steps of exposing a surface of said glass to vapor emanating from said solution in a substantially air-tight container, maintaining a uniform distance at all points on said surface between said surface and said solution, maintaining said glass and said solution at substantially the same temperature, and continuing said exposure until the index of refraction of said surface has been substantially reduced.

4. The method of reducing the index of refraction of a glass surface which comprises treating said surface with fluosilicic acid vapor equivalent to that existing in a closed chamber at a distance approximately 1½ inches from an aqueous solution of fluosilicic acid having a molarity between 1 and 2.5 and a silica number between 1.03 and 1.10, and continuing said treatment until a purple interference color is observed when said surface is viewed in white light.

5. The method of producing a low reflection transparent surface on glass which includes the step of skeletonizing a surface layer of said glass to a depth approximating a quarter wavelength of a component of visible light, or an odd integral multiple thereof, with gas emanated from a solution of fluosilicic acid having a molarity between the approximate limits of 1 and 2.5 and a silica number between the approximate limits of 1.03 and 1.10 while maintaining said glass and said solution at approximately room temperature and continuing said skeletonization until the index of refraction of said surface is of the order of the square root of the index of refraction of the untreated glass.

6. The method set forth in claim 5 which includes the additional step of maintaining a 1½ inch spacing between the surface of said glass and said solution.

7. The method of producing a low reflection transparent surface on glass by means of vapor emanated from a solution of fluosilicic acid which comprises adjusting the concentration of said solution to a molarity between the approximate limits of 1 and 2.5, adjusting the silica number of said solution to a value between the approximate limits of 1.03 to 1.10, exposing said glass to the vapor emanated from said solution in the absence of circulating air, and continuing said exposure until a purple interference color is observed when said surface is observed in white light.

FREDERICK H. NICOLL.
FERD E. WILLIAMS.

REFERENCES CITED

The following references are of record in the file of this patent:

UNITED STATES PATENTS

| Number | Name | Date |
| --- | --- | --- |
| 254,263 | Bitterlin | Feb. 28, 1882 |
| 1,565,869 | Straw | Dec. 15, 1925 |
| 2,215,039 | Hood | Sept. 17, 1940 |
| 2,337,460 | French | Dec. 21, 1943 |
| 2,410,300 | Nicoll | Oct. 29, 1946 |